United States Patent [19]
Yoshimura et al.

[11] Patent Number: 5,632,537
[45] Date of Patent: May 27, 1997

[54] CRAWLER BELT FOR CRAWLER MOTOR VEHICLE

[75] Inventors: Hajime Yoshimura, Tokyo; Kouichi Uchibaba; Takahiro Yamamoto, both of Kawagoe; Koichi Matsumoto, Matsubara; Yoshio Ueno; Kenichi Sakai, both of Kishiwada, all of Japan

[73] Assignees: Honda Giken Kogyo Kabushiki Kaisha, Tokyo; The Ohtsu Tire & Rubber Co., Ltd., Izumi-ohtsu, both of Japan

[21] Appl. No.: 216,167

[22] Filed: Mar. 22, 1994

[30] Foreign Application Priority Data

| Jun. 4, 1993 | [JP] | Japan | 5-134902 |
| Jun. 4, 1993 | [JP] | Japan | 5-134903 |
| Jun. 7, 1993 | [JP] | Japan | 5-136218 |
| Jun. 29, 1993 | [JP] | Japan | 5-159107 |

[51] Int. Cl.$^6$ ............................................. B62D 55/26
[52] U.S. Cl. .............. 305/173; 305/178; 305/184; 305/194
[58] Field of Search ............................ 305/35, 35 EB, 305/38, 39, 15, 19, 56, 165, 167, 170, 173, 184, 191, 194, 193; 152/209 R, 209 B, 209 WT, 209 D

[56] References Cited

U.S. PATENT DOCUMENTS

| 2,537,745 | 1/1951 | Daniels | 305/38 X |
| 3,533,663 | 10/1970 | Pianalto | 305/35 EB X |
| 3,900,231 | 8/1975 | Ohm | 305/38 X |
| 4,298,046 | 11/1981 | Herbelleau et al. | 152/209 D X |
| 4,667,718 | 5/1987 | Fontaine | 152/209 D X |
| 4,815,512 | 3/1989 | Gerresheim et al. | 152/209 D X |
| 4,846,091 | 7/1989 | Ives | 305/35 EB X |

FOREIGN PATENT DOCUMENTS

| 0072469 | 5/1980 | Japan | 305/38 |
| 0145072 | 11/1980 | Japan | 305/38 |
| 4189687 | 7/1982 | Japan | 305/35 EB |
| 4201786 | 7/1992 | Japan | 305/38 |

*Primary Examiner*—Russell D. Stormer
*Attorney, Agent, or Firm*—Rosen, Dainow & Jacobs, L.L.P.

[57] ABSTRACT

A crawler belt for use on a crawler motor vehicle has an elongate belt body drivable in a predetermined direction, and a plurality of ridges mounted on a ground contact side of the belt body, each of the ridges having at least one sipe defined in a free end thereof for allowing the ridge to be flexibly deformable in a direction opposite to the predetermined direction. Each of the ridges has a plurality of sipes defined therein and extending longitudinally thereof or substantially perpendicularly to the predetermined direction. The ridges comprise a plurality of chevron-shaped ridges pointing toward the predetermined direction and succesively arranged at predetermined spaced intervals in the predetermined direction. The ridges are divided into a plurality of groups each including a plurality of ridges by grooves extending transversely of the belt body, and divided into a plurality of segments by at least one longitudinal groove extending longitudinally of the belt body.

12 Claims, 7 Drawing Sheets

CRAWLER BELT FOR CRAWLER MOTOR VEHICLE

BACKGROUND OF THE INVENTION

1. Field of the Invention

The present invention relates to a crawler belt for use on a crawler motor vehicle.

2. Description of the Prior Art

Generally, crawler belts have a flat and wide surface area for contact with a road, and hence apply a relatively low pressure from the flat and wide surface area to the road. When a crawler motor vehicle with such crawler belts runs on a road which is wet with rain or the like, the frictional force between the crawler belts and the road, i.e., the grip of the crawler belts, tends to be lowered, resulting in reduced traction. Such a disadvantage is aggravated by the tendency for the crawler belts to fail to discharge water from recesses in their road contact surfaces. Therefore, the crawler belts are required be improved to achieve running stability on wet roads, muddy roads, snow-covered roads, and icy roads. The higher the grip of the crawler belts, the better the running stability thereof.

One conventional crawler belt proposed in Japanese laid-open utility model publication NO. 3-103506 has a pattern of ridges on its outer circumferential surface, i.e., its road contact surface. The pattern of ridges includes rib-like ridges and lug-like ridges arrayed on the road contact surface of the crawler belt. Specifically, the crawler belt has arrays of rib-like ridges on its center and arrays of lug-like ridges on its opposite ends, and side guides on the reverse side for preventing the crawler belt from being dislodged from the wheels around which it is trained.

Grooves defined in the road contact surface of the disclosed crawler belt are generally surrounded by adjacent ones of the ridges. Therefore, water or mud cannot easily be discharged from the grooves, particularly from those grooves which are located in the central region of the crawler belt, when the crawler belt is running on a wet road or a muddy road. Consequently, the conventional crawler belt also suffers a relatively small frictional force between itself and the road, i.e., a small grip, and cannot apply desired traction.

The lug-like ridges are of a rectangular cross-section having a rectangular edge profile in the transverse direction of the crawler belt. When the rectangular edges of the lug-like ridges hit surface irregularities of the road or are caught by grooved trails of the road while the crawler belt is running on the road, the crawler belt tends to lose its running stability, particularly, its straight running stability. In addition, when the rectangular edges of the lug-like ridges hit surface irregularities of the road, the crawler belt is liable to produce vibration and noise called road noise.

While a crawler motor vehicle with crawler belts trained around drive and idle wheels is running on rough terrain, the crawler belts thereof tend to be elastically deformed by ground surface irregularities, causing the drive and idle wheels to be disengaged from the crawler belts.

There has thus been a demand for improved crawler belts for higher running stability.

SUMMARY OF THE INVENTION

It is therefore an object of the present invention to provide a crawler belt for use on crawler motor vehicles which has higher running stability.

According to the present invention, there is provided a crawler belt comprising an elongate belt body drivable in a predetermined direction, and a plurality of ridges mounted on a ground contact side of said belt body, each of said ridges having at least one sipe defined in a free end thereof for allowing the ridge to be flexibly deformable in a direction opposite to said predetermined direction.

Each of the ridges may have a plurality of sipes defined therein and extending longitudinally thereof or substantially perpendicularly to the predetermined direction. The sipes thus defined are effective in increasing the grip of the crawler belt with respect to a road, increasing the traction that can be produced by the crawler belt, and improving the stability with which the crawler belt runs.

Preferably, the ridges may comprise a plurality of chevron-shaped ridges pointing toward the predetermined direction and successively arranged at predetermined spaced intervals in the predetermined direction. The ridges may be divided into a plurality of groups each including a plurality of ridges by grooves extending transversely of the belt body, and divided into a plurality of segments by at least one longitudinal groove extending longitudinally of the belt body.

For example, the segments may comprise end segments on opposite side ends of the belt body and a central segment disposed between the end segments, the end and central segments being separated by at least two longitudinal grooves extending longitudinally of the belt body. When the crawler belt runs on a wet road or the like, open spaces between the segments allow water to be discharged effectively, and the separate segments improve the grip of the crawler belt on the road.

The end segments may include end segments of rectangular cross section having respective rectangular edges and end segments of arcuate cross section having respective arcuate edges, the end segments of rectangular and arcuate cross section alternating with each other longitudinally of the belt body. The alternating end segments prevent belt edges from being caught by groove trails on the road, so that the crawler belt can run stably, particularly straight stably, on the road. Since mud can easily be discharged out of the open spaces between the segments, the traction on muddy roads is improved. Inasmuch as edges of the end segments of rectangular cross section are merely brought into intermittent engagement with surface irregularities of the road, the vibration or road noise caused by the crawler belt is lower than the conventional crawler belt which has ridge segments of rectangular cross section only.

The crawler belt may include a plurality of side guides projecting on a reverse side of the belt body opposite to the ground contact side at intervals in the longitudinal direction of the belt body, the side guides being disposed behind the end segments of rectangular cross section. More preferably, the side guides may include a plurality of pairs of confronting side guides on opposite side ends of the belt body, further including a plurality of pairs of reinforcing plates each attached to confronting surfaces of the respective side guides in each pair, and a plurality of joint members each interconnecting the reinforcing plates in one pair and embedded in the reverse side of the belt body between the side guides in one pair, at least one of the side guides having a reinforcing rib embedded therein and joined to the corresponding joint member in a position interposed between the joint member and the corresponding end segment of rectangular cross section. With this arrangement, the end segments of rectangular cross section are reinforced with the side guides for less deformation. The crawler belt can thus run straight stably on round terrain. Furthermore, when the end segments of rectangular cross section, which are integral with the side guides, are engaged by the road, they prevent the side guides from being deformed. Even if large lateral forces are applied to the side guides from rear or idle wheels of a crawler motor vehicle on which the crawler belts are mounted, any deformation of the side guides is minimum, and the rear or idle wheels are prevented from being dislodged from the crawler belts.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
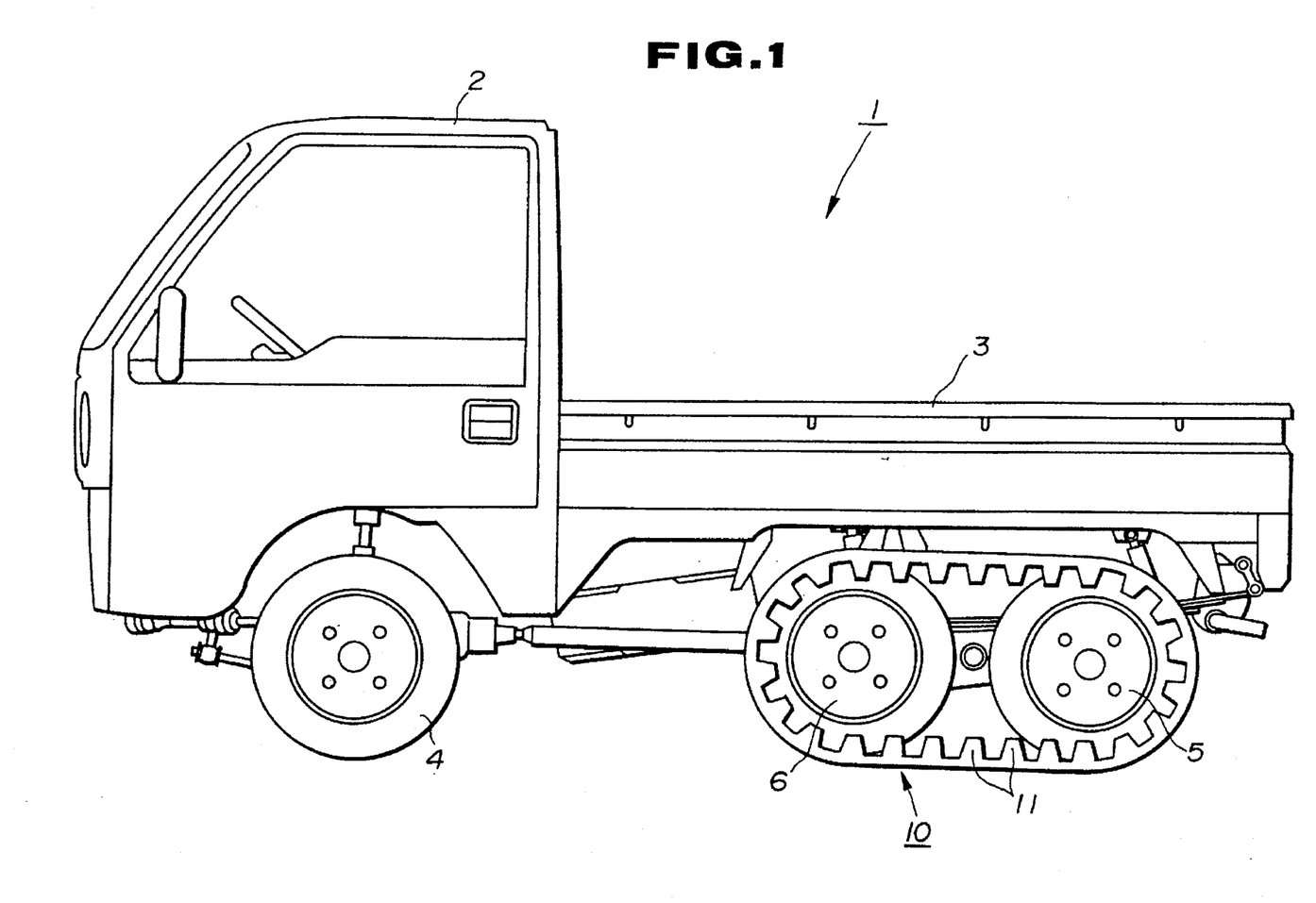
FIG. 1 is a side elevational view of a crawler motor vehicle with crawler belts according to a first embodiment of the present invention.

As shown in FIG. 1, a crawler motor vehicle 1 with crawler belts according to the present invention is in the form of a light truck, for example, which generally comprises a motor vehicle body including a cabin 2 and a cargo floor 3.

The crawler motor vehicle 1 has a pair of laterally spaced steerable front wheels 4, a pair of laterally spaced rear drive wheels 5, and a pair of laterally spaced idle wheels 6 interposed between the rear and front wheels 4, 5 and positioned adjacent to the rear wheels 5.

The wheels 4, 5, 6 have respective pneumatic tires of rubber. The crawler motor vehicle 1 also includes a pair of laterally spaced flexible crawler belts 10 trained around respective sets of the rear and idle wheels 5, 6. Each of the crawler belts 10 comprises an endless belt made of a flexible material such as an elastomeric material such as rubber. Each of the crawler belts 10 has an array of tooth-shaped side guides 11 projecting on each of its outer side edges of the reverse side opposite to the ground contact side thereof.

Figure 2:
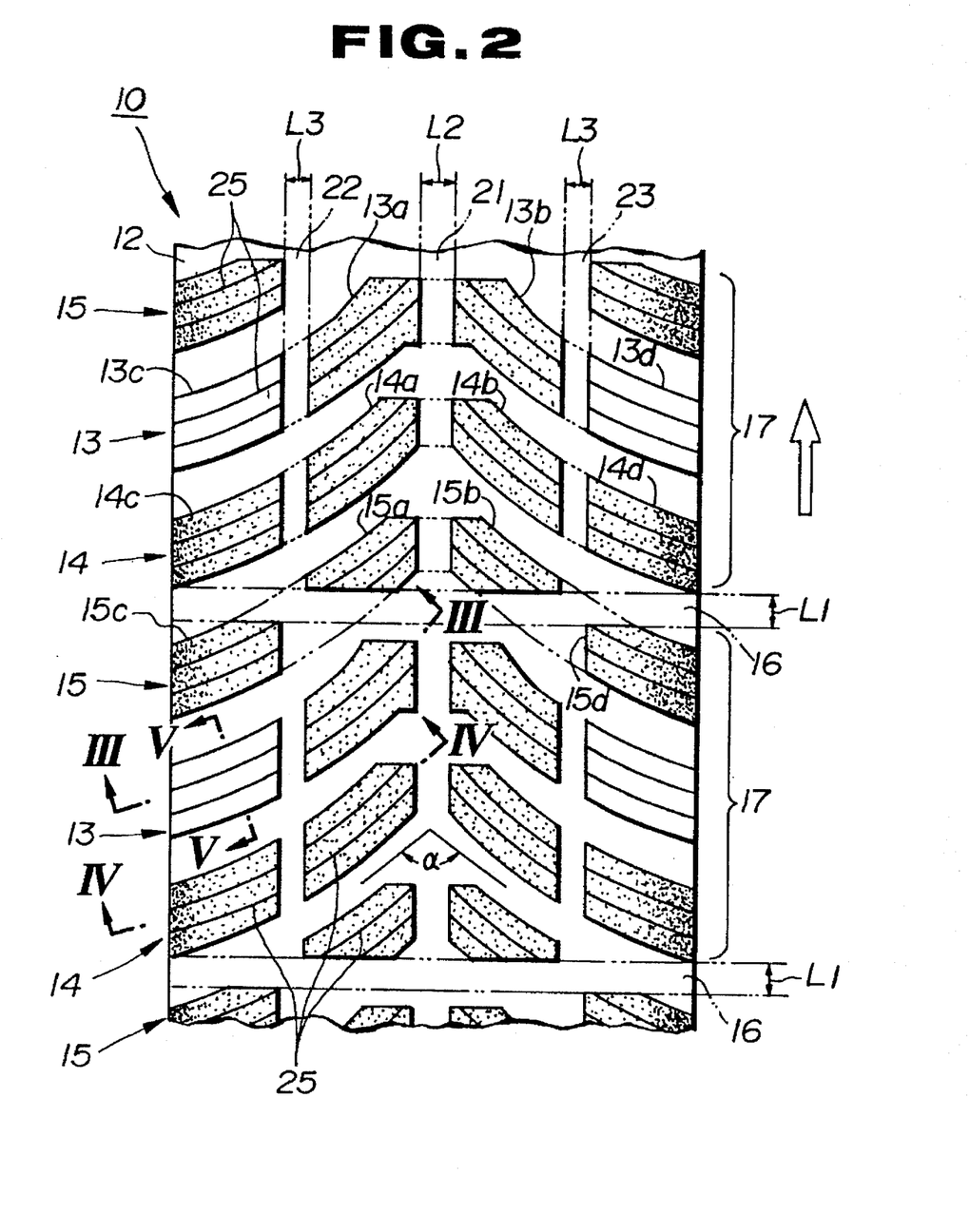
FIG. 2 is an enlarged fragmentary plan view of a road contact surface of each of the crawler belts of the crawler motor vehicle shown in FIG. 1.

FIG. 2 fragmentarily shows one of the crawler belts 10 at an enlarged scale.

As shown in FIG. 2, the crawler belt 10 has an elongate belt body 12 supporting on its ground contact side a plurality of alternate series of first, second, and third substantially chevron-shaped, or inverted V-shaped, flat-crest ridges 13, 14, 15 that are successively arranged at predetermined intervals in the longitudinal direction indicated by the blank arrow in which the crawler belt 10 moves. The chevron-shaped ridges 13, 14, 15 point toward the longitudinal direction indicated by the blank arrow. Adjacent two of the chevron-shaped ridges 13, 14, 15 overlap each other, i.e., the central point or head of one of the chevron-shaped ridge enters between the diagonal stripes or trail of the other chevron-shaped ridge, by a distance which is about half the extent of each of the chevron-shaped ridges 13, 14, 15 in the longitudinal direction of the crawler belt 10.

The chevron-shaped ridges 13, 14, 15 are grouped into a plurality of block areas 17 each composed of a plurality of, e.g., three, chevron-shaped ridges 13, 14, 15 by transverse narrow grooves or open areas 16 each extending across the crawler belt 10 and each having a width L1. The width L1 is of such a small value that no road noise will be produced by the block areas 17 separated by the grooves 16. Each of the chevron-shaped ridges 13, 14, 15 is divided into four segments by three longitudinal grooves, i.e., a central groove 21 having a width L2 and two longitudinal grooves 22, 23 each having a width L3, the grooves 21, 22, 23 extending in the longitudinal direction of the crawler belt 10 grooves 22 and 23 respectively establishing left side and right side subgroups of ridges as seen in FIG. 2.

More specifically, each of the first chevron-shaped ridges 13 is composed of two central segments 13a, 13b transversely separated from each other by and shaped symmetrically with respect to the central groove 21, and two end segments 13c, 13d transversely separated from the central segments 13a, 13b by the lateral grooves 22, 23 shaped symmetrically with respect to the central groove 21. Similarly, each of the second chevron-shaped ridges 14 is composed of two central segments 14a, 14b transversely separated from each other by and shaped symmetrically with respect to the central groove 21, and two end segments 14c, 14d transversely separated from the central segments 14a, 14b by the lateral grooves 22, 23 shaped symmetrically with respect to the central groove 21. Each of the third chevron-shaped ridges 15 is composed of two central segments 15a, 15b transversely separated from each other by and shaped symmetrically with respect to the central groove 21, and two end segments 15c, 15d transversely separated from the central segments 15a, 15b by the lateral grooves 22, 23 shaped symmetrically with respect to the central groove 21.

In each of the block areas 17, the first chevron-shaped ridge 13, the second chevron-shaped ridge 14, and the third chevron-shaped ridge 15 are successively arranged in the order named in the longitudinal direction of the crawler belt 10. However, the central segments 15a, 15b and the end segments 15c, 15d of the third chevron-shaped ridge 15 are also separated from each other by one of the transverse grooves 16, and only the end segments 15c, 15d belong to an adjacent block area 17.

Figure 3:
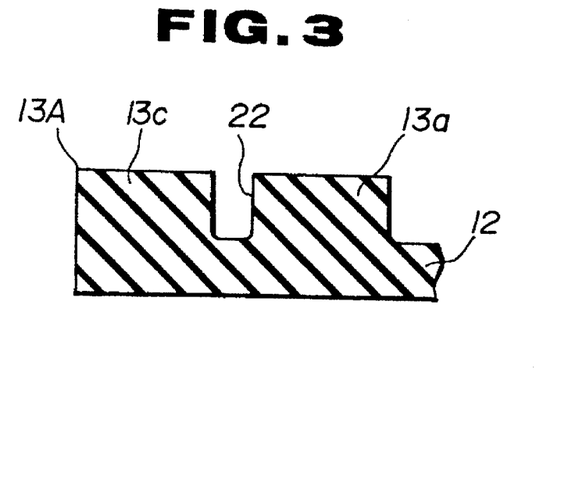
FIG. 3 is an enlarged cross-sectional view taken along line III—III of FIG. 2.

As shown in FIG. 3, the end segments 13c, 13d of the first chevron-shaped ridges 13 have a rectangular cross-sectional shape, including a rectangular edge 13A, in the transverse direction of the crawler belt 10.

Figure 4:
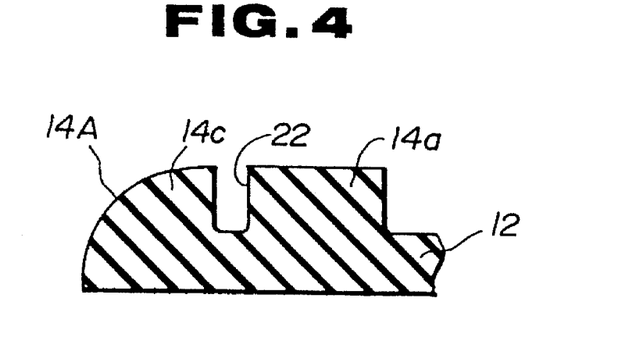
FIG. 4 is an enlarged cross-sectional view taken along line IV—IV of FIG. 2.

As shown in FIG. 4, the end segments 14c (14d) of the second chevron-shaped ridges 14 have an arcuate cross-sectional shape, including an arcuate or sectorial edge 14A, in the transverse direction of the crawler belt 10. Similarly, the end segments 15c (15d) of the second chevron-shaped ridges 15 also have an arcuate cross-sectional shape, including an arcuate or sectorial edge, in the transverse direction of the crawler belt 10.

Figure 5:
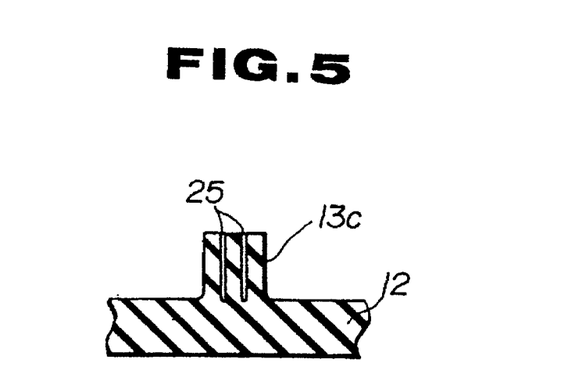
FIG. 5 is an enlarged cross-sectional view taken along line V—V of FIG. 2.

FIG. 5 shows at least one, i.e., two spaced slits or sipes 25 in the illustrated embodiment, which are defined in the surface of an end segment 13c in a direction normal to the ground contact side of the crawler belt 10, the sipes 25 also extending substantially perpendicularly to the direction in which the crawler belt 10 runs.

Figure 6:
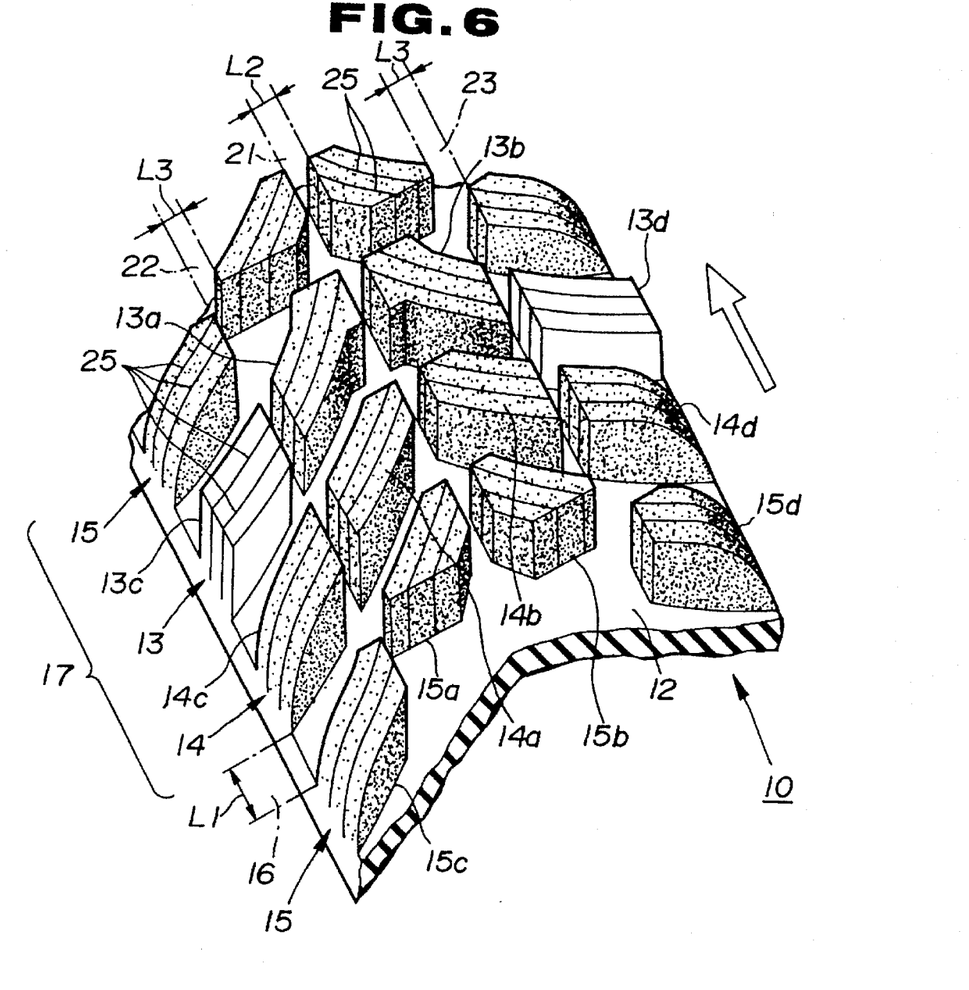
FIG. 6 is an enlarged fragmentary perspective view of the crawler belt shown in FIG. 2.

As shown in FIG. 6, the end segments 13c, 13d (see FIG. 3) of rectangular cross section, the end segments 14c, 14d (see FIG. 4) of arcuate cross section, and the end segments 15c, 15d of arcuate cross section, are successively arranged in the direction in which the crawler belt 10 runs.

Each of the segments 13a–13d, 14a–14d, 15a–15d has two spaced slits or sipes 25 defined therein in a direction normal to the ground contact side of the crawler belt 10. The sipes 25 of each of the first, second, and third chevron-shaped ridges 13, 14, 15 are collectively shaped as a chevron within the chevron of the ridge, i.e., extend collectively in the longitudinal direction of the ridge transversely across the crawler belt 10 and substantially perpendicularly to the direction in which the crawler belt 10 runs. The sipes 25 make the segments 13a–13d, 14a–14d, 15a–15d and hence the first, second, and third chevron-shaped ridges 13, 14, 15 flexibly deformable in the longitudinal direction of the crawler belt 10. The number and shape of sipes 25 are determined in view of the area of contact of the segments 13a–13d, 14a–14d, 15a–15d with the road and also the grip thereof which depend upon the flexible deformation of these segments.

As shown in FIG. 2, the first, second, and third chevron-shaped ridges 13, 14, 15 should preferably have an angle α in the range of from 100° to 140° in order to discharge water effectively from the road contact side of the crawler belt 10. The first, second, and third chevron-shaped ridges 13, 14, 15 should also preferably be of a shape curved gradually back toward the direction in which the crawler belt 10 runs, such that they extend substantially perpendicularly to the direction in which the crawler belt 10 runs, in order to produce a sufficient degree of grip on the road. For example, each of the chevron-shaped ridges 13 is curved, in its extent from the central segment 13a (or 13b) toward the end segment 13c (or 13d), gradually back toward the direction in which the crawler belt 10 runs.

While only one of the crawler belts 10 has been described above, the other crawler belt 10 will not be described below as they are symmetrical in configuration.

Figure 7:
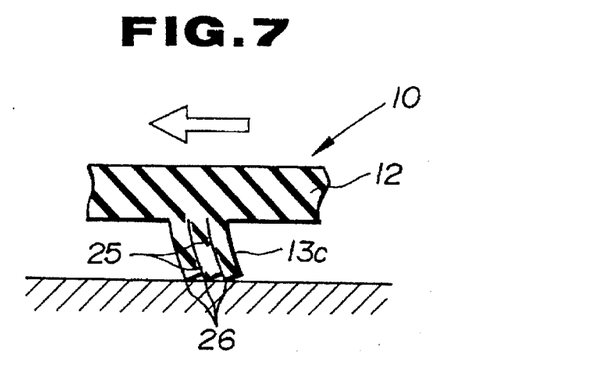
FIG. 7 is a fragmentary cross-sectional view showing the manner in which sipes in a ridge of the crawler belt shown in FIG. 2 operate.

FIG. 7 shows the manner in which the end segments of the chevron-shaped ridges 13, 14, 15, e.g., the end segment 13c, operate in contact with a road surface.

As shown in FIG. 7, when the crawler belt 10 runs on a road, e.g., a wet road, a snow-covered road, an icy road, etc., in the direction indicated by the blank arrow, the end segment 13c of rectangular cross section is flexibly deformed in a direction opposite to the direction in which crawler belt 10 runs, upon contact with the road. Edges 26 of the end segment 13c which are provided by the sipes 25 bite into the road surface, locally increasing the grip on the road. The increased grip makes up for any shortage of the pressure under which the crawler belt 10 contacts the road, allowing the crawler belt 10 to run stably on a wet road, a snow-covered road, an icy road, etc., and exert increased traction on the road. The sipes 25 which extend longitudinally along the end segments 13c are effective to draw water film from the surface of a wet road and discharge the drawn water laterally off the crawler belt 10.

The other end segments 13a,13b, 13d, 14a–14d, 15a–15d operate in the same manner as described above.

Since there are open spaces defined between the segments 13a–13d,14a–14d,15a–15d of the chevron-shaped ridges 13, 14, 15 by the grooves 16, 21, 22, 23, and these open spaces are inclined in a direction opposite to the direction in which the crawler belt 10 runs, the crawler belt 10 can effectively discharge water from the surface of a wet road. The crawler belt 10 thus permits the crawler motor vehicle to run stably, particularly in a straight direction, on a wet road, a snow-covered road, an icy road, etc.

Inasmuch as both the segments 13c, 13d of rectangular cross section and the segments 14c, 14d, 15c, 15d of arcuate cross section are present on the opposite outer side edges of the belt body 12, the side edges of the crawler belt 10 are less liable to be caught by groove trails on the road, so that the ability of the crawler belt 10 to run straight stably is further increased. The traction imposed by the crawler belt 10 on a muddy road is also increased because the mud can easily be discharged from between the end segments on the opposite outer side edges of the belt body 12.

With both the segments 13c, 13d of rectangular cross section and the segments 14c, 14d, 15c, 15d of arcuate cross section being present on the opposite outer side edges of the belt body 12, the edges 13A of the end segments 13c, 13d are merely brought into intermittent engagement with surface irregularities of the road. Consequently, the vibration or road noise caused by the crawler belt 10 is lower than the conventional crawler belt which has ridge segments of rectangular cross section only.

In view of the above advantages offered by the crawler belt 10, the crawler motor vehicle equipped with the crawler belts 10 according to the present invention can run stably on paved roads, unpaved roads, wet roads, snowy roads, icy roads, or the like, and can also run stably at relatively high speeds.

A crawler belt 10' according to a second embodiment of the present invention will be described below with reference to FIGS. 8 through 10.

The crawler belt 10' according to the second embodiment is designed to achieve higher stability when running straight and to prevent wheels from being disengaged from the crawler belt 10', as well as the advantages accomplished by the crawler belt 10 according to the first embodiment.

Figure 8:
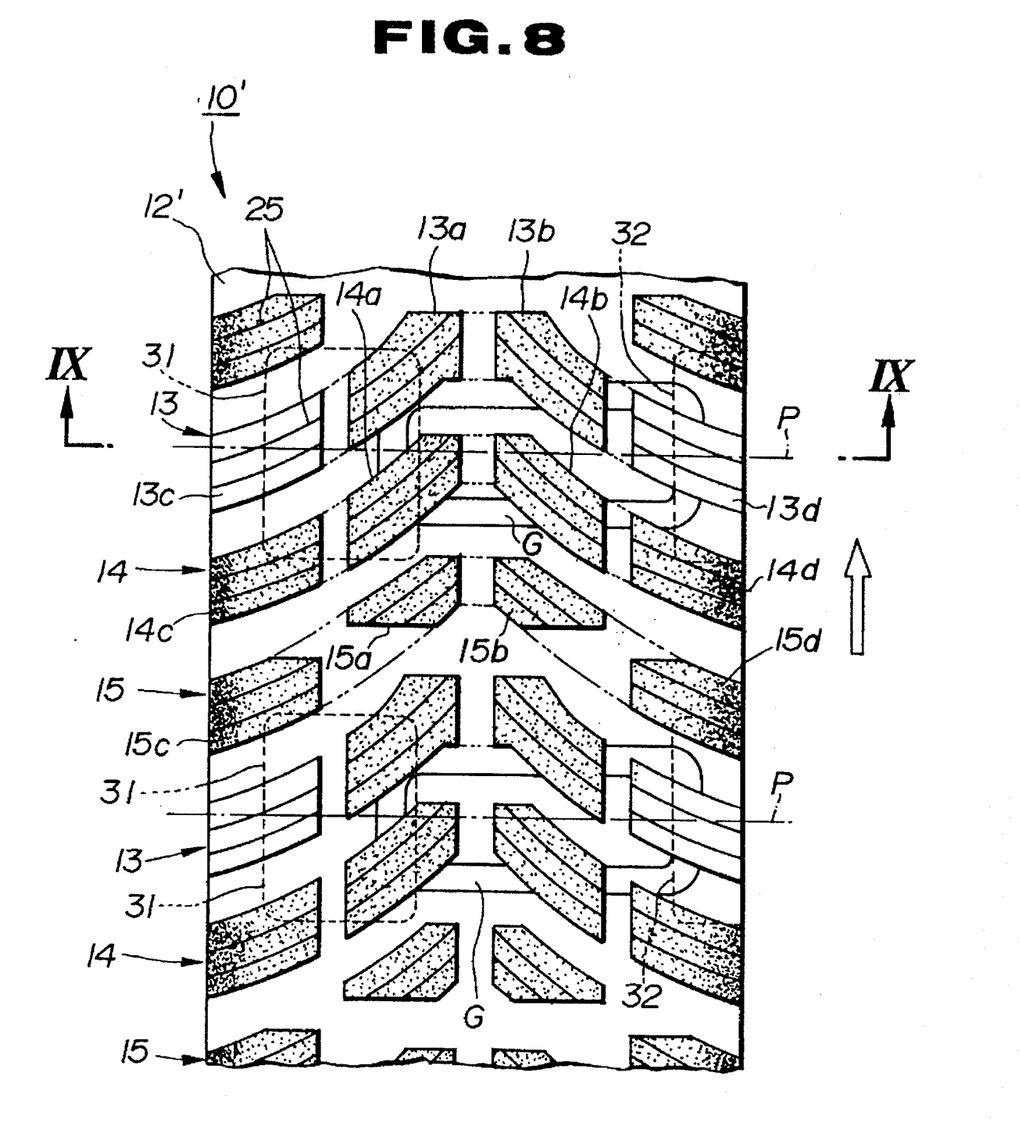
FIG. 8 is an enlarged fragmentary plan view of a road contact surface of a crawler belt according to a second embodiment of the present invention.

AS shown in FIG. 8, the crawler belt 10' according to the second embodiment has ridges on the road contact side thereof and side guides on the reverse side thereof, the ridges and the side guides being arranged in a special layout. The other details are identical to those of the crawler belt 10 according to the first embodiment shown in FIGS. 1 through 7, and are denoted by identical reference numerals and will not be described in detail below. The crawler belt 10' is a left-hand crawler belt as viewed in the direction in which the crawler motor vehicle travels, and the right-hand crawler belt will not be described in detail below as it is of a symmetrical shape.

The crawler belt 10' includes a belt body 12' having a plurality of outer side guides 31 and a plurality of inner side guides 32 projecting on its reverse side (opposite to the ground contact side). The outer and inner side guides 31, 32, which are laterally spaced from each other, are provided in longitudinally spaced pairs, and the outer and inner side guides 31, 32 of each pair are laterally aligned in confronting relationship with each other on a transverse line P passing transversely across the belt body 12' substantially through the centers of the end segments 13c, 13d of rectangular cross section of one of the first chevron-shaped ridges 13.

Figure 9:
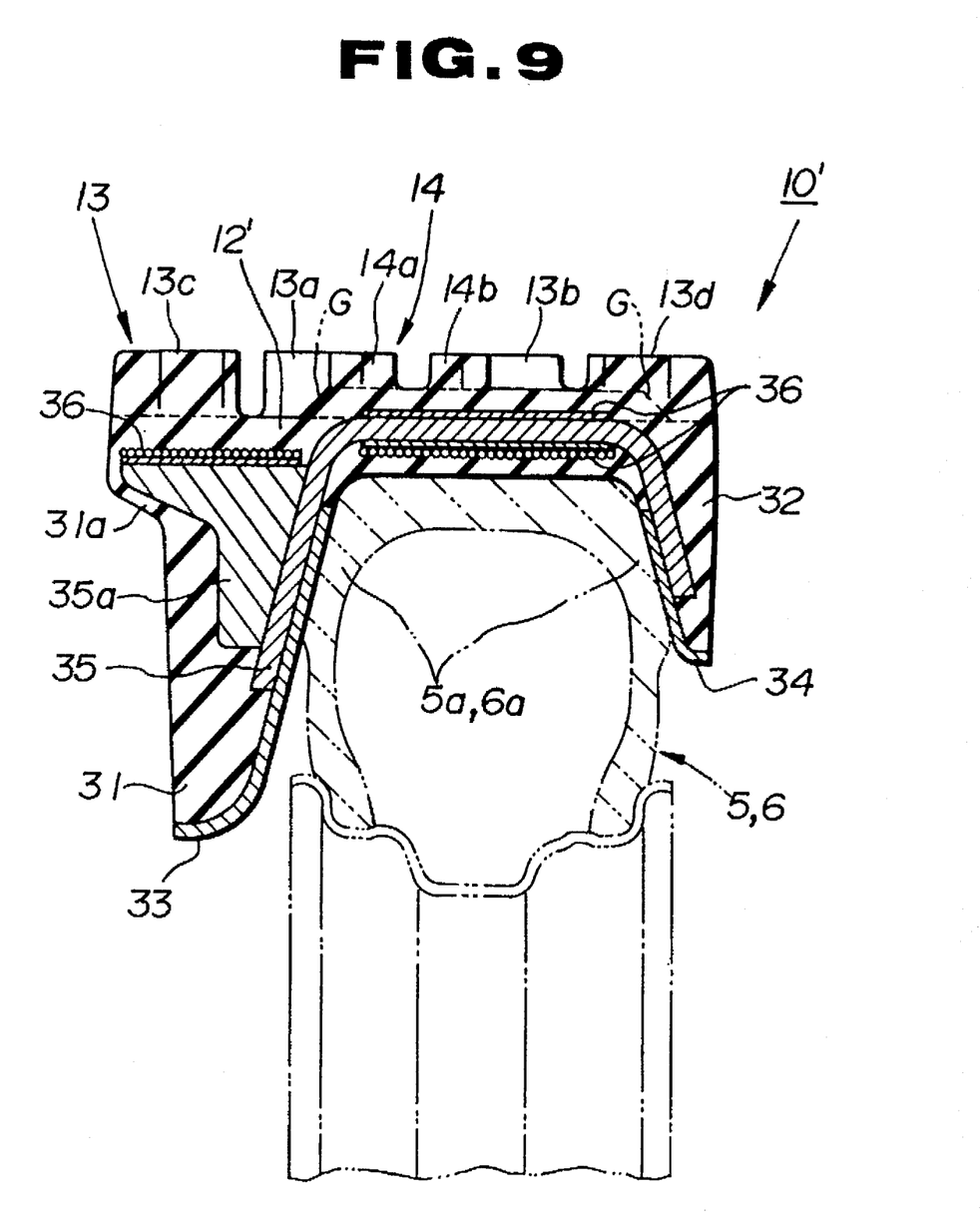
FIG. 9 is an enlarged cross-sectional view taken along line IX—IX of FIG. 8.

As shown in FIG. 9, the outer and inner side guides 31, 32 in each pair project integrally from the belt body 13', which is trained around the rear and idle wheels 5, 6 that are indicated by the imaginary lines.

The side guides 31, 32 in each pair are of respective tapered shapes pointing toward their tip ends away from the belt body 12', and have respective tapered wall surfaces confronting each other and lined with respective reinforcing plates 33, 34. The reinforcing plates 33, 34 are joined to a web-shaped joint member 35 which is embedded in the belt body 12' and extending into and between the side guides 31, 32. Therefore, the side guides 31, 32 are stiffened against forces that are applied thereto in directions toward each other. Particularly, a reinforcing rib 35a is fixed to the joint member 35 and embedded in the outer side guide 31. Since the reinforcing rib 35a is interposed between the joint member 35 and the end segment 13c of rectangular cross section, any forces that are applied to the end segment 13c of rectangular cross section are transferred directly to the joint member 35.

The belt body 12' is reinforced with a number of core wires 36 embedded therein above and below the flat central portion of the joint member 35 which lies in the belt body 12'. Thus, the joint member 35 is integrally combined with the belt body 12' by the core wires 36 that surround the flat central portion of the joint member 35.

As shown in FIGS. 8 and 9, the belt body 12' has a plurality of circumferentially spaced rectangular lands disposed on its ground contact side in alignment with the respective lines P. Each of the lands has opposite ends overlapping the outer and inner side guides 31, 32, respectively, and an upwardly inclined edge G facing outwardly.

Figure 10:
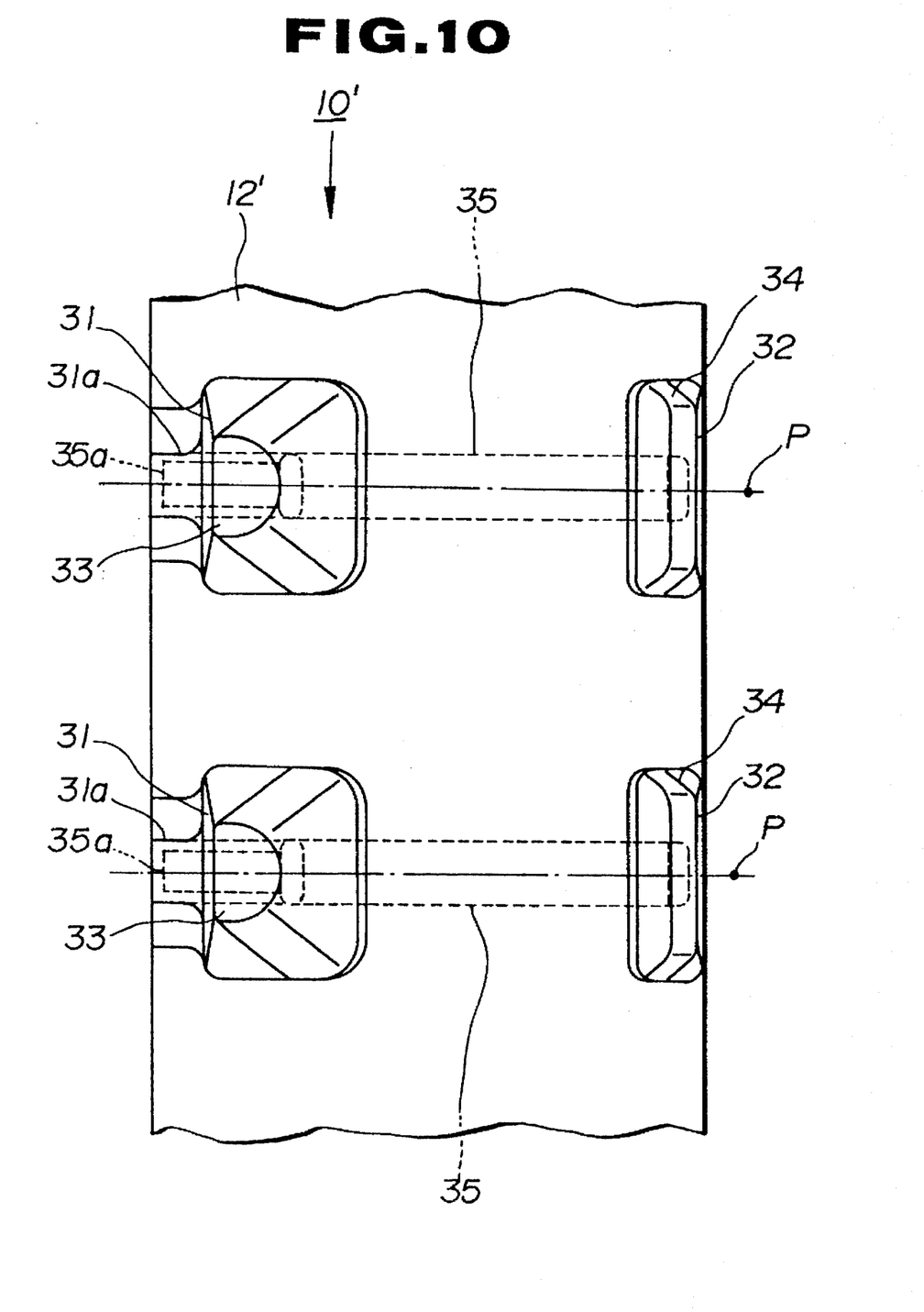
FIG. 10 a fragmentary plan view of a reverse side of the crawler belt shown in FIG. 8.

FIG. 10 fragmentarily shows the reverse side of the crawler belt 10'. In FIG. 10, the outer side guides 31 are positioned at spaced intervals on the respective lines P in the direction in which the crawler belt 10' runs, i.e., in the circumferential or longitudinal direction thereof. The outer side guides 31 thus positioned do not prevent the crawler belt 10' from being flexibly deformed in the directions normal to the belt body 12', i.e., to the sheet of FIG. 10. The inner side guides 32 that are paired with the outer side guides 31 are also positioned at spaced intervals on the respective lines P, and hence do not prevent the crawler belt 10' from being flexibly deformed in the same directions. Consequently, the side guides 31, 32 jointly allow the crawler belt 10' to be flexibly deformed in those directions.

With the arrangement of the crawler belt 10' according to the second embodiment, the end segments 13c, 13d of rectangular cross section on the ground contact side of the crawler belt 10' and the side guides 31, 32 on the reverse side thereof assist in increasing the rigidity of each other. As shown in FIG. 9, therefore, the end segments 13c, 13d of rectangular cross section with the rectangular edges are reinforced with the side guides 31, 32 on the reverse side, and are prevented from being greatly flexibly deformed while the crawler belt 10' is running. Consequently, the crawler motor vehicle with the crawler belts 10' can run straight stably on rough terrain.

When the side guides 31, 32 are pressed by respective side walls 5a, 6a of the rear and idle wheels 5, 6, the crawler belt 10' is subjected to lateral pushing forces tending to push it laterally. Since, however, frictional forces opposite to those pushing forces are developed between the end segments 13c, 13d and the road, the crawler belt 10' is prevented from moving laterally, and the side guides 31, 32 are caused by the pushing forces to be deformed outwardly. At this time, the rectangular edges of the end segments 13c, 13d of rectangular cross section positioned directly below the side guides 31, 32 are brought into contact with the road, thereby limiting such deformation of the side guides 31, 32. Therefore, even if the rear and idle wheels 5, 6 are caused to move laterally, they are not dislodged from the side guides 31, 32.

The crawler motor vehicle 1 equipped with the crawler belts 10, 10' is not limited to the illustrated light truck with six wheels including rear drive wheels. The crawler belts according to the present invention are also usable on any of various other crawler motor vehicles.

The crawler belt 10, 10' may be made of another flexible material such as plastic or the like, rather than rubber, and may comprise an integral belt body or an articulated or chain belt body. The crawler belt 10, 10' may be driven by sprocket wheels, for example, rather than by the wheels 5 with pneumatic tires of rubber.

The shapes, dimensions, and number of grooves 16, 21, 22, 23 may be determined in view of the desired abilities of the crawler belt 10, 10' to discharge water and to run straight stably, and the desired level of road noise to be achieved. The number of ridges 13, 14, 15 and the number of their segments in each of the block areas 17 may be determined based on the shapes, dimensions, and number of grooves 16, 21, 22, 23.

The edges of the end segments 14c, 14d, 15c, 15d alternating with the end segments 13c, 13d may be of any arcuate cross-sectional shape insofar as they are effective in lowering road noise, allowing the crawler belt 10, 10' to run straight stably, and exerting enough traction on a muddy road.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed:

1. A crawler belt comprising
    (a) an elongate endless belt body extending longitudinally and having a first side for ground contact and a second side opposite said first side, said belt body being drivable longitudinally in a first direction; and
    (b) a plurality of ridges on said first side extending outward therefrom, each of said ridges comprising a plurality of sipes defined therein and extending longitudinally thereof for allowing said ridge to be flexibly deformable in a second direction opposite said first direction;
    said ridges formed into groups respectively defining a plurality of at least partial chevron-shapes all pointing in said first direction, said groups successively arranged at predetermined spaced intervals in said first direction, said groups being separated from each other by grooves extending transversely and generally perpendicular of said longitudinal extent of said belt body; and each of said groups is divided into a plurality of sub-groups by at least two transversely spaced grooves extending longitudinally of said belt body, thus forming a left side subgroup, a right side subgroup and central segments disposed between said left and right side subgroups, and wherein each left and right side subgroup comprises at least one first end segment having a generally rectangular cross-section and at least one second end segment having a convex arcuate edge outward of said belt body.

2. A crawler belt according to claim 1, further comprising:

a plurality of side guides projecting inwardly on said second side of said belt body and spaced at intervals longitudinally on the belt body, said guides being disposed on said second side of the belt body generally opposite said end segments of rectangular cross-section on said first side of said belt body.

3. A crawler belt according to claim 2, wherein each of said side guides comprises a plurality of pairs of confronting projections spaced apart transversely of the belt body.

4. A crawler belt according to claim 3 wherein each of said side guides further comprises a plurality of pairs of reinforcing plates each attached to said confronting projections of the respective side guides in each pair, and a plurality of joint members each interconnecting the reinforcing plates in one pair and embedded in said second side of said belt body between the side guides in one pair, at least one of said side guides having a reinforcing rib embedded therein and joined to the corresponding joint member in a position interposed between said joint member and the corresponding end segment of rectangular cross-section.

5. A crawler belt according to claim 1 wherein the end segments of each sub-group comprise two end segments having said convex arcuate edges separated by one end segment having said rectangular cross-section.

6. A crawler belt according to claim 1 having a greater number of said convex arcuate end segments than said rectangular end segments.

7. A crawler belt comprising (a) an elongate endless belt body extending longitudinally and having a first side for ground contact and a second side opposite said first side, said belt body being drivable longitudinally in a first direction, (b) a plurality of ridges on said first side extending outward therefrom, each of said ridges comprising a plurality of sipes defined therein and extending longitudinally thereof for allowing said ridge to be flexibly deformable in a second direction opposite said first direction, said ridges formed into groups respectively defining a plurality of at least partial chevron-shapes pointing in said first direction, said groups successively arranged at predetermined spaced intervals in said first direction, said groups of ridges being divided by grooves extending transversely and generally perpendicular of said longitudinal extent of said belt body, and wherein each of said groups is divided into a plurality of sub-groups by at least two transversely spaced grooves extending longitudinally of said belt body, and wherein each of said sub-groups comprises end segments on opposite ends of the transversely extending group of ridges and central segments disposed between said end segments, and wherein said end segments comprise at least one first end segment comprising a generally rectangular cross-section as seen in a plane perpendicular to said first direction and at least one second end segment having a convex arcuate edge outward of said belt body as seen in cross-section taken in a plane perpendicular to said first direction, and (c) a plurality of side guides projecting inwardly on said second side of said belt body and spaced at intervals longitudinally on the belt body, said guides being disposed on said second side of the belt body generally opposite said end segments of rectangular cross section on said first side of said belt body, wherein each of said side guides comprise a plurality of pairs of confronting projections spaced apart transversely of the belt body, and wherein each of said side guides further comprises a plurality of pairs of reinforcing plates each attached to said confronting projections of the respective side guides in each pair, and a plurality of joint members each interconnecting the reinforcing plates in one pair and embedded in said second side of said belt body between the side guides in one pair, at least one of said side guides having a reinforcing rib embedded therein and joined to the corresponding joint member in a position interposed between said joint member and the corresponding end segment of rectangular cross section.

8. A crawler belt according to claim 7 wherein the end segments of each of sub-group comprise two end segments having said convex arcuate edges separated by one end segment having said rectangular cross-section.

9. A crawler belt according to claim 7 having a greater number of said convex arcuate end segments than said rectangular end segments.

10. A crawler belt comprising (a) an elongate endless belt body extending longitudinally and having a first side for ground contact and a second side opposite said first side, said belt body being drivable longitudinally in a first direction, b) a plurality of ridges on said first side extending outward therefrom, each of said ridges comprising a plurality of sipes defined therein and extending longitudinally thereof for allowing said ridge to be flexibly deformable in a second direction opposite said first direction, said ridges formed into groups successively arranged at predetermined spaced intervals in said first direction, said groups of ridges being divided by grooves extending transversely and generally perpendicular of said longitudinal extent of said belt body, and wherein each of said groups is divided into a plurality of sub-groups by at least two transversely spaced grooves extending longitudinally of said belt body, and wherein each of said sub-groups comprises end segments on opposite ends of the transversely extending group of ridges and central segments disposed between said end segments, and wherein said end segments comprise at least one first end segment comprising a generally rectangular cross-section as seen in a plane perpendicular to said first direction and at least one second end segment having a convex arcuate edge outward of said belt body as seen in cross-section taken in a plane perpendicular to said first direction, and (c) a plurality of side guides projecting inwardly on said second side of said belt body and spaced at intervals longitudinally on the belt body, said guides being disposed on said second side of the belt body generally opposite said end segments of rectangular cross section on said first side of said belt body, wherein each of said side guides comprise a plurality of pairs of confronting projections spaced apart transversely of the belt body, and wherein each of said side guides further comprises a plurality of pairs of reinforcing plates each attached to said confronting projections of the respective side guides in each pair, and a plurality of joint members each interconnecting the reinforcing plates in one pair and embedded in said second side of said belt body between the side guides in one pair, at least one of said side guides having a reinforcing rib embedded therein and joined to the corresponding joint member in a position interposed between said joint member and the corresponding end segment of rectangular cross section.

11. A crawler belt according to claim 10 wherein the end segments of each of subgroup comprise two end segments having said convex arcuate edges separated by one end segment having said rectangular cross-section.

12. A crawler belt according to claim 10 having a greater number of said convex arcuate end segments than said rectangular end segments.

* * * * *